United States Patent Office 2,712,628
Patented July 5, 1955

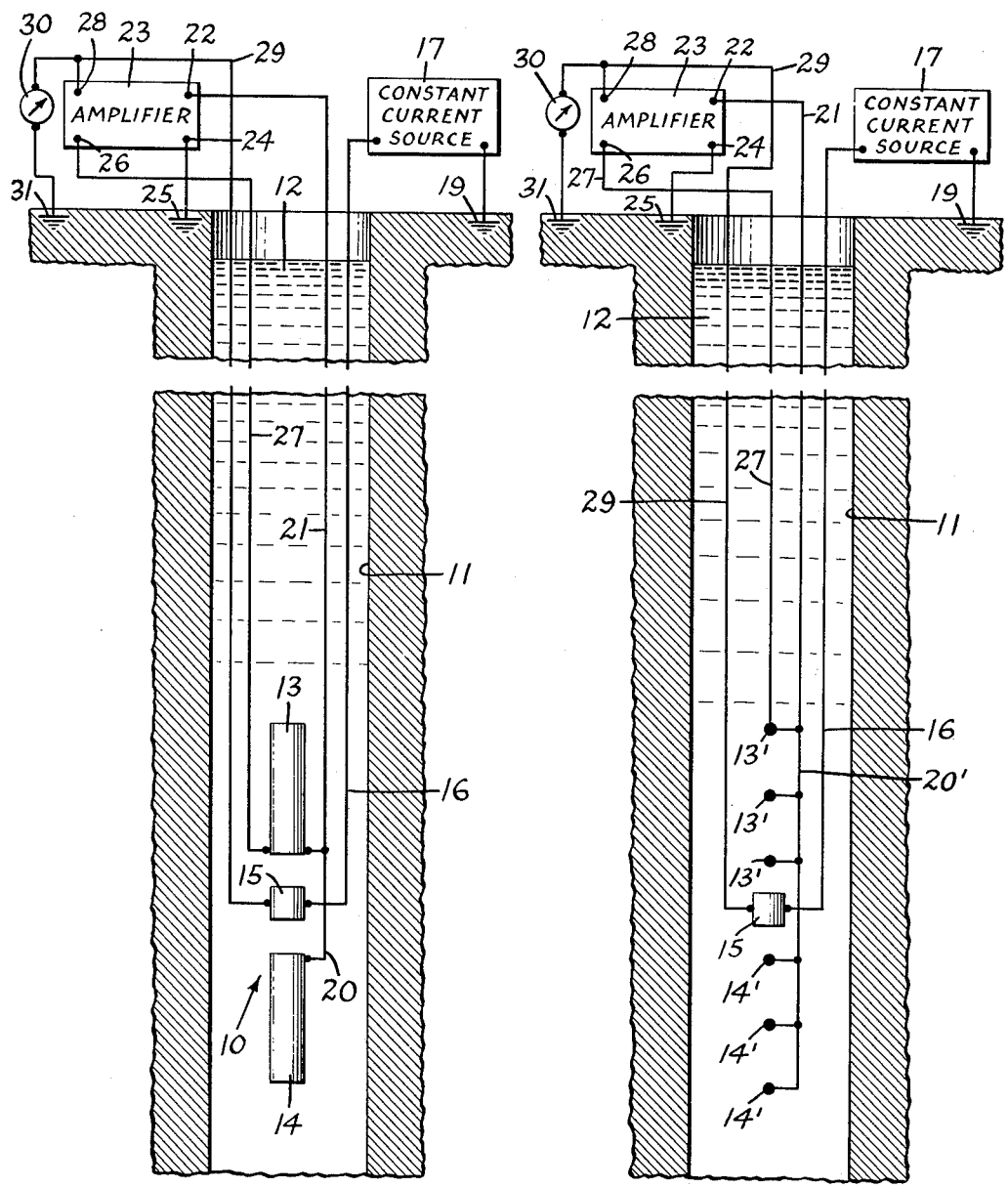

2,712,628

ELECTRICAL LOGGING APPARATUS

Henri-Georges Doll, Ridgefield, Conn., assignor to Schlumberger Well Surveying Corporation, Houston, Tex., a corporation of Delaware Application February 19, 1951, Serial No. 211,788

5 Claims. (Cl. 324—1)

The present invention relates to electrical logging and more specifically to new and improved apparatus which is adapted to provide relatively highly detailed logs of the electrical resistivity of earth formations traversed by a well in a simple and highly effective manner.

The applicant has already devised a number of highly effective systems for obtaining detailed electrical logs of earth formations traversed by a well. The copending application Serial No. 161,641, filed May 12, 1950, for "Electrical Resistivity Well Logging Method and Apparatus" is addressed to this subject matter. In the systems there disclosed, electric fields are established above and below a current emitting electrode which are controlled so as to block any substantial flow of current longitudinally of the bore hole so that the current is compelled to flow laterally and substantially perpendicularly to the wall of the bore hole. As a result, logs made by recording variations in a suitably selected potential difference associated with the flow of current through the formations are characterized by considerable detail and represent the true resistivities of the formations to a relatively high degree of accuracy.

The present application is addressed to well logging apparatus of this type which may embody fewer electrodes so that it is somewhat simpler in construction and operation.

In accordance with the invention, the apparatus lowered into the bore hole may comprise as few as three electrodes, i. e., a central current emitting electrode and upper and lower electrodes disposed symmetrically about the current emitting electrode. Preferably, the upper and lower electrodes are elongated while the current emitting electrode is shorter and of substantially the same diameter as the upper and lower electrodes. The current emitted by the central electrode is preferably of substantially constant intensity, and current is also supplied to both of the elongated electrodes so as to maintain the potential difference between those electrodes and the central electrode substantially at zero. A log of the electrical resistivity of the formations is made by recording variations in the potential difference between the central electrode and a point at a reference potential as the apparatus is moved to different positions in a well.

In another embodiment, a plurality of longitudinally spaced apart, electrically connected electrodes may be substituted for each of the elongated electrodes.

The invention may be better understood from the following detailed description of several typical embodiments thereof, taken in conjunction with the accompanying drawings in which:

Fig. 1 is a schematic diagram of electrical logging apparatus constructed according to the invention; and Fig. 2 illustrates a modification of Fig. 1 in which a plurality of electrically connected electrodes are substituted for the elongated electrodes.

In Fig. 1, well logging apparatus 10, constructed according to the invention, is shown disposed in a bore hole 11 containing a column of conducting liquid 12.

The well logging apparatus 10 comprises a pair of relatively elongated electrodes 13 and 14 symmetrically disposed on opposite sides of a central current emitting electrode 15. The electrodes 13, 14 and 15 are maintained in fixed spaced relationship with respect to one another in any suitable manner and the electrode assembly is adapted to be raised and lowered in the bore hole by means of a supporting cable (not shown) in the usual manner.

The central electrode 15 is connected by an insulated conductor 16 to one terminal of a source of electrical energy 17 located at the surface of the earth, the other terminal of which is grounded at 19. The source 17 may be either A. C. or D. C., although A. C. at a relatively low frequency is preferred, and it should be designed to supply electric current of substantially constant intensity to the electrode 15.

According to the invention, electric fields are established above and below the electrode 15 in the bore hole and they are controlled in such fashion as to maintain the potential difference between the electrodes 13 and 14 and the central electrode 15 substantially at zero. To this end, the elongated electrodes 13 and 14 are connected together by an insulated conductor 20 to which is also connected an insulated conductor 21, the upper end of which is connected to one terminal 22 of an amplifier 23 located at the surface of the earth. The other terminal 24 of the amplifier 23 is connected to ground at 25. One input terminal 26 of the amplifier 23 is connected by an insulated conductor 27 to the elongated electrode 13, and the other amplifier input terminal 28 is connected by an insulated conductor 29 to the central current emitting electrode 15. The conductor 29 is also connected to one terminal of a conventional high impedance indicating instrument 30, the other terminal of which is grounded at 31. The instrument 30 is preferably of the recording type which is used in conventional electrical logging operations.

The amplifier 23 may be of any suitable type which is adapted to receive a voltage input and to provide a current output at the terminals 22 and 24.

In operation, electric current of substantially constant intensity is emitted by the electrode 15 into the bore hole 11 and the surrounding formations. If any potential difference exists between the electrodes 13 and 14 and the electrode 15, as there will be when the apparatus is first energized, for example, this potential difference will be applied to the input terminals 26 and 28 of the amplifier 23 causing electric current to be supplied at the output terminals 22 and 24 thereof. Amplifier output current is supplied through the conductor 21 to the elongated electrodes 13 and 14 until the potential difference between those electrodes and the central electrode 15 is reduced substantially to zero. Under these conditions, substantially no current from the electrode 15 can flow longitudinally of the bore hole and the main body of current is compelled to flow laterally and substantially perpendicular to the wall of the bore hole 11. As long as these conditions prevail, it has been found that the potential difference between the central electrode 15 and the ground 31 at the surface is accurately representative of the true electrical resistivity of the earth formation surrounding the bore hole 11 at the approximate depth of the electrode 15.

A log of electrical resistivity may be made by moving the apparatus 10 through the borehole while energized as described above and recording the potential difference between the electrode 15 and the ground 31 as a function of depths in the bore hole by means of the recording instrument 30.

If desired, a plurality of longitudinally spaced apart, electrically interconnected electrodes may be substituted for the elongated electrodes 13 and 14, as shown in Fig. 2. Here, a plurality of substantially point electrodes 13' longitudinally spaced apart within a distance approximately equal to the length of the electrode 13 take the place of the latter electrode. Similarly, a plurality of substantially point electrodes 14' longitudinally spaced apart within a distance approximately equal to the length of the elongated electrode 14 take the place of that electrode. The electrodes 13' and 14' are electrically interconnected by means of an insulated conductor 20' which is connected to the insulated conductor 21 which extends to the apparatus at the surface of the earth. This modification operates in essentially the same manner as the apparatus of Fig. 1.

In a typical well logging apparatus of the type shown in Fig. 1 for use in the field, the electrodes 13 and 14 might be say 4 feet in length and approximately 3 inches in diameter; the electrode 15 is shorter than the electrodes 13 and 14 but may be of approximately the same diameter; and the spacing between each of the electrodes 13 and 14 and the electrode 15 may be between 1 and 2 inches. For the embodiment shown in Fig. 2, the electrode 15 may be essentially the same as in Fig. 1, while the distance between the outermost electrodes 13 should be approximately equal to the length of the elongated electrode 13, the spacing between the outermost electrodes 14' likewise being approximately equal to the length of the electrode 14. The spacings between the electrodes 13' and 14' and the central electrode 15 may be substantially the same as the spacings between the electrodes 13 and 14 and the electrode 15 in Fig. 1.

The invention thus provides novel well logging apparatus which is simple in construction and operation yet which enables relatively highly detailed logs of the electrical resistivity of earth formations traversed by a bore hole to be obtained.

If desired, another geophysical exploring device, such as a radioactivity detector, for example, with or without an associated source of radioactivity might be placed inside the electrode array shown in Fig. 1 to enable any conventional radioactivity log to be made simultaneously with the resistivity log. Similar combinations will suggest themselves to those skilled in the art.

The several specific embodiments described above are obviously susceptible of modification within the spirit of the invention. For example, any other similar device may be substituted for the amplifier 23 such as, for example, a servoamplifier control system of the type disclosed in the copending application of George K. Gillies filed September 26, 1951, Serial No. 248,384, for Servomechanism Control System. Also, while point electrodes 13' and 14' have been shown in Fig. 2, it will be apparent that electrodes of other shapes such as separate ring-like electrodes or insulated segments of elongated electrodes, for example, may be employed. Also, any desired number of electrodes 13' and 14' may be used. Further, since electrodes 13 and 14, or 13' and 14', are maintained at substantially the same potential as electrode 15, resistivity indications may be obtained in accordance with the invention by measuring the potential difference between conductor 27 and a reference point. The invention, therefore, is not to be limited save as defined in the appended claims.

I claim:

1. Well logging apparatus comprising an electrode adapted to be moved through a well, a source of electrical energy connected between said electrode and a point remote therefrom to supply current to said electrode, electrode means disposed symmetrically above and below said electrode in constant spatial relation thereto, automatic means including said electrode means and responsive to the potential difference between said electrode means and said electrode for supplying current to said electrode means to continuously maintain said potential difference constant and substantially at zero, and means for exhibiting a function of the variations in potential difference between said electrode or electrode means and a point at a reference potential.

2. Well logging apparatus comprising a first electrode adapted to be moved through a well, a source of electrical energy connected between said electrode and a point remote therefrom to supply current to said first electrode, a pair of electrically interconnected elongated electrodes disposed symmetrically above and below said first electrode in constant spatial relation thereto, automatic means including said pair of electrodes and responsive to variations in the potential gradient at a location between at least one of the electrodes in said pair and said first electrode for supplying current to said pair of electrodes so as to continuously maintain said potential gradient constant and substantially at zero, and means for exhibiting a function of the variations in potential difference between said first electrode or pair of electrodes and a point at a reference potential.

3. Well logging apparatus comprising a first electrode adapted to be moved through a well, a source of electrical energy connected between said electrode and a point remote therefrom to supply current of substantially constant intensity to said first electrode, a plurality of electrically interconnected electrodes disposed symmetrically in groups of more than one above and below said first electrode, respectively, in constant spatial relation thereto, automatic electrical means responsive to the potential difference between said plurality of interconnected electrodes and said first electrode for supplying current to said plurality of electrodes so as continuously to maintain said potential difference constant and substantially at zero, and means for exhibiting a function of the potential difference between said first electrode and a point at a reference potential.

4. Well logging apparatus comprising a first electrode adapted to be moved through a well, a source of electrical energy connected between said electrode and a point remote therefrom to supply current of substantially constant intensity to said first electrode, a plurality of electrically interconnected elongated electrodes disposed symmetrically above and below said first electrode in constant spatial relation thereto, electrical means responsive to the potential difference between said plurality of interconnected electrodes and said first electrode for automatically supplying current to said plurality of electrodes so as continuously to maintain said potential difference substantially at zero, and means for exhibiting a function of the potential difference between said first electrode and a point at a reference potential.

5. Well logging apparatus comprising a pair of longitudinaly spaced apart, electrically interconnected, elongated electrodes mounted for movement through a bore hole, a third electrode disposed intermediate the electrodes of said pair in constant spatial relation thereto, said third electrode being shorter than but of substantially the same diameter as the electrodes comprising said pair, electrical means responsive to the potential difference between said pair of electrodes and said third electrode for automatically supplying current to said pair of electrodes so as continuously to maintain said potential difference substantially at zero, and means for exhibiting a function of the potential difference between said third electrode and a point at a reference potential.

References Cited in the file of this patent

UNITED STATES PATENTS

| 2,084,143 | Hummell | June 15, 1937 |
| 2,347,794 | Piety | May 2, 1944 |
| 2,446,303 | Owen | Aug. 3, 1948 |